Sept. 29, 1931.　　　　J. H. HUNT　　　　1,825,400
SHOCK ABSORBER
Filed Nov. 27, 1929
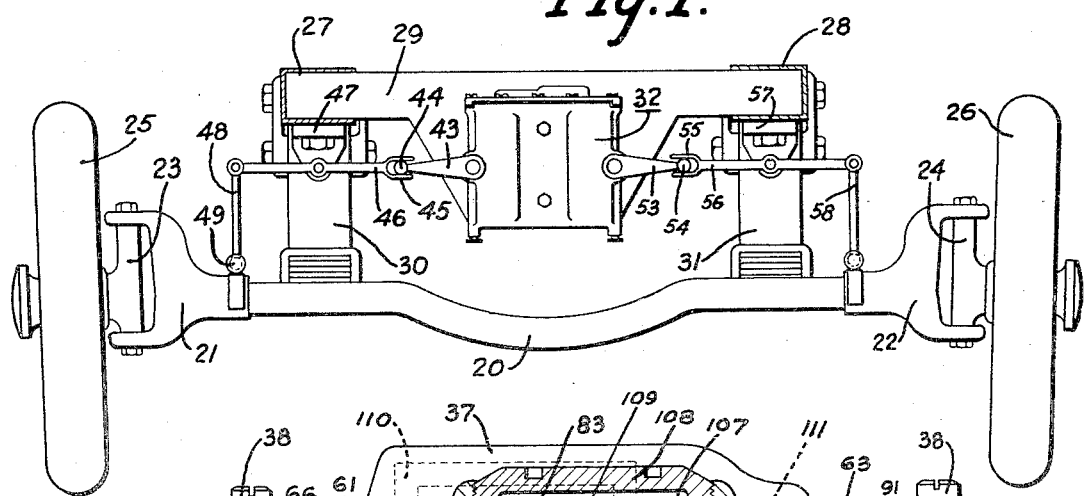
Fig. 1.
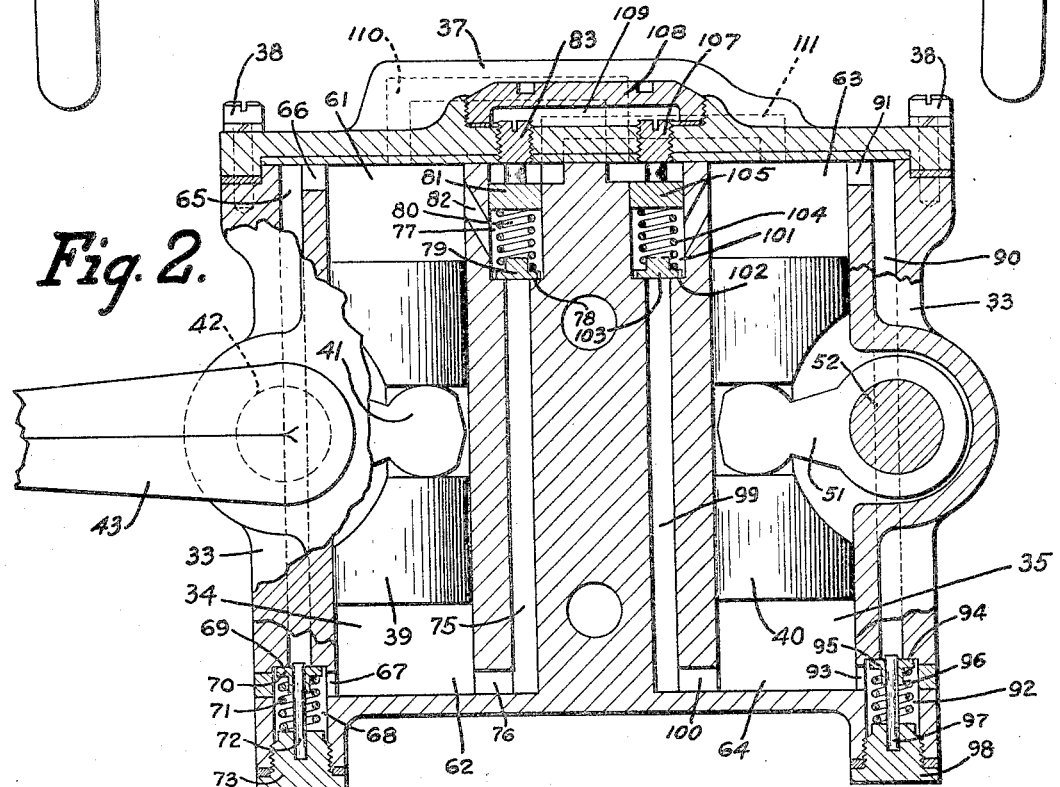
Fig. 2.
Fig. 3.
Inventor
JOHN H. HUNT
By Spencer, Hardman and Fehr
Attorneys Patented Sept. 29, 1931

1,825,400

UNITED STATES PATENT OFFICE

JOHN H. HUNT, OF DETROIT, MICHIGAN, ASSIGNOR TO DELCO PRODUCTS CORPORATION, OF DAYTON, OHIO, A CORPORATION OF DELAWARE

SHOCK ABSORBER

Application filed November 27, 1929. Serial No. 410,096.

This invention relates to a device for controlling the relative movement between two relatively movable members, for instance the frame of a vehicle and the axle thereof upon which said frame is resiliently supported.

It is among the objects of the present invention to eliminate wobbling, commonly called "shimmying" of the steering road wheels of a vehicle by resisting the "tramping" action of said wheels.

Shimmying of the road wheels of a vehicle is the oscillating, wobbly movement of said wheels about their hinged support. Shimmying disagreeably affects proper steering of the vehicle, particularly at high speeds.

The "tramping" of the steering road wheels of a vehicle is the tendency of the axle to move in a see-saw fashion about an intermediate point, and is particularly noticeable when the vehicle is operating at comparatively high speeds.

Experiments and tests have demonstrated that shimmying and tramping occur substantially simultaneously, the former generally being a resultant of the latter. If tramping can substantially be prevented, then shimmying of the steering road wheels may be reduced to a marked degree.

The present invention provides a fluid displacement device including relatively movable members, one of which is secured or carried by the frame of the vehicle, others being operatively connected to the respective ends of the axle of the vehicle. When the axle moves relatively to the frame members in a "similar" manner, that is, when both ends of the axle approach or move away from their respective frame members at a substantially constant speed, or, as might be said, when the movement of the axle is substantially parallel to the two side members of the frame, the device offers substantially equal restriction to such axle movement. Under these conditions no tramping of the road wheels of the vehicle occurs. When a "dissimilar" movement between the frame members and axle obtains, that is, when the one end of the axle approaches or moves away from its respective frame member at a rate of speed differing from the approach, or moving away of the other end of the axle to or from its frame member respectively, or, in another case, when one end of the axle approaches its frame member while the other end of the axle moves away from its frame member, or vice versa, tramping will obtain, said tramping resulting in wheel shimmy, which seriously affects steering. This dissimilar movement or tramping causes the fluid displacement device to offer increased resistance to the relative movement between one end of the axle and its respective frame member, thereby tending to reduce or substantially balance such "dissimilar" movement.

Further objects and advantages of the present invention will be apparent from the following description, reference being had to the accompanying drawings, wherein a preferred embodiment of one form of the present invention is clearly shown.

In the drawings:

Fig. 1 is a front view of a vehicle chassis with the device of the present application attached.

Fig. 2 is a fragmentary vertical sectional view, certain of the parts being shown in elevation for the sake of clearness.

Fig. 3 is a view showing a modified form of fluid displacement device.

Referring to the drawings, the vehicle axle is designated by the numeral 20, said axle having a fork formation 21 at one end and a similar fork formation 22 at the opposite end, between which the spindle members 23 and 24 are hingedly supported, respectively. The spindle member 23 rotatably supports the steering road wheel 25 of the vehicle while steering road wheel 26 is rotatably supported upon the spindle 24. Any suitable steering mechanism, not shown, may be attached to the spindles 23 and 24.

The frame of the vehicle comprises side members 27 and 28 secured together by certain cross members, one of which is designated by the numeral 29. Frame member 27 is supported upon the axle 20 by the vehicle spring 30, while frame member 28 is supported upon the axle 20 by the spring member 31.

The cross member 29 supports the fluid displacement device, which is generally designated by the numeral 32.

The fluid displacement device comprises a casing 33, presenting two cylinders 34 and 35, the open ends of which are provided with the cover member 37 secured to the casing by screws 38. Within the cylinders 34 and 35 there are provided pistons 39 and 40 respectively. The piston 39 is reciprocated by a rocker arm 41 which is secured to the rocker shaft 42 journalled in one side of the housing or casing 33. One end of the rocker shaft 42 extends to the outside of the casing and has the arm 43 provided thereon. The arm 43 has a ball end 44 which is received by the forked end 45 of the lever 46, said lever being pivotally supported intermediate its ends by the bracket 47 secured to the frame member 27 in any suitable manner. The end of the lever 46, opposite the forked end 45, is hingedly secured to one end of a connecting link 48, the other end of said link being fastened by a ball and socket connection 49 to the axle 20 adjacent the forked end 21 thereof. Piston 40, like piston 39, is operated by a rocker arm 51, secured to the rocker shaft 52 which is journalled in bearings provided by the casing 33. The end of said rocker shaft 52 extends outside the casing 33 and has the operating arm 53 provided thereon. The outer end of arm 53 has a ball formation 54 received by the forked end 55 of the lever 56 which, like lever 46, is pivotally supported intermediate its ends upon the bracket 57 of the frame member 28. The one end of the link connection 58 is secured to the end of the lever 56 opposite the forked end 55 thereof, the other end of said link connection 58 being swivelly connected to the axle 20 adjacent the forked end 22 thereof.

From the aforegoing it may be seen that as the axle 20 approaches the frame members 27 and 28 with a "similar" movement, and by "similar" is meant at an equal rate, pistons 39 and 40 will be moved toward the cover 37 of the device at substantially an equal rate. When the axle moves away from the frame members 27 and 28 with a "similar" movement, the movement of the pistons 39 and 40 will be reversed, that is, they will be moved away from the cover 27 at a substantially equal rate. If, however, the relative movement between frame members 27 and 28 and the axle 20 is "dissimilar," that is, if for instance the end of the axle 20 moves toward the member 27, and on the other end away from the frame member 28, a "dissimilar" movement obtains, thus piston 39 will be moved upwardly toward the cover 37 and the piston 40 downwardly or away from the cover 37.

The piston 39 provides two compression chambers within the cylinder 34, the upper compression chamber being designated by the numeral 61, the lower compression chamber by the numeral 62. Piston 40 forms upper compression chamber 63 and lower compression chamber 64 within the cylinder 35. The compression chambers of each respective cylinder are connected by two separate ducts. One of the ducts connecting compression chambers 61 and 62 of the cylinder 34 is designated by the numeral 65, said duct having a cross passage 66 leading directly into the compression chamber 61 and a cross passage 67 leading directly into the compression chamber 62. Cross passage 67 and the lower end of duct 65, communicate with the valve chamber 68 which presents a valve seat 69 upon which the valve 70 is maintained by a spring 71. Valve 70 is slidably supported upon the valve pin 72 carried by the screw plug 73 which is received by the screw-threaded end of the valve chamber 68. Spring 71 is interposed between the plug 73 and the valve 70. The other duct which connects compression chambers 61 and 62 is designated by the numeral 75, said duct having a cross passage 76 opening directly into the compression chamber 62, while the other end of the duct 75 opens into the valve chamber 77. A valve seat 78 is provided in the valve chamber 77 upon which valve 79 is normally maintained by spring 80 interposed between the valve 79 and an abutment block 81 slidably contained within the valve chamber 77. Valve 79 has undulations in its edge so that it will be guided into proper engagement with its seat 78 and when unseated will not impede the flow established. A passage 82 connects the valve chamber 77 with the compression chamber 61. The cover 37 carries a screw plug 83 which provides a stop against which the spring 80 normally urges the abutment block 81. Operation of the screw 83 in one or the other direction changes the position of the block 81 in the valve chamber 77 and thus changes the tension of the spring 80 upon valve 79.

The one duct connecting the compression chambers 63 and 64 of the cylinder 35 is designated by the numeral 90, a cross passage 91 leading from the duct 90 into the compression chamber 63 while the opposite end of said duct opens into the valve chamber 92 which is in communication with the compression chamber 64 through the cross passage 93. A valve seat 94 is provided in the valve chamber 92 upon which valve 95 is yieldably maintained by a spring 96. Valve 95 is slidably supported upon pin 97 carried by the screw plug 98 received in the screw-threaded end of the valve chamber 92. The other duct connecting chambers 63 and 64 is designated by the numeral 99, one end of which communicates with the chamber 64 through the cross passage 100, the other end terminating in the valve chamber 101 which is provided with a valve seat 102. Valve 103 is yieldably urged upon the valve seat 102 by a spring 104, one end of which engages the abutment block 105 slidably supported within the valve chamber 101. The movement of the abutment block 105 is limited in one direction by the screw plug 107 which is carried by the cover 27 and may be adjusted to vary the tension of the spring 104 upon the valve 103.

In order to reduce leaks past the screw plugs 83 and 107, a gasketed cover cap 108 is provided on the cover 37 whereby a chamber 109 is provided in which any fluid, which may leak past the screws 83 and 107, will be trapped. The cap 108 is arranged to receive a tool whereby it may be removed to render the screws 83 and 107 accessible for adjustment purposes.

Cover 37 is provided with a passage or duct 110, one end of which communicates with the compression chamber 61, the other with a recess in the casing which recess communicates with the valve chamber above the abutment block 105. Another duct 111 leads from the compression chamber 63 of the cylinder 35 to a recess in the casing communicating with the valve chamber 77 above the abutment block 81.

The device operates as follows:

When the axle approaches the frame members with a "similar" movement ("similar" having been defined heretofore) then the link connections with the two pistons 39 and 40 will move said pistons upwardly toward the cover cap 37 so that fluid within the compression chambers 61 and 63 will be forced into their respective ducts 65 and 90 through the cross passages 66 and 91 respectively. The fluid in the duct 65 will, when a proper fluid pressure is attained, move the valve 70 from its seat 69, and thus will be established a restricted flow of fluid from the compression chamber 61 into the compression chamber 62. The fluid in duct 90 will likewise move its valve 95 from the valve seat 94 and thus a restricted flow of fluid will be established from the compression chamber 63 into the compression chamber 64 of the cylinder 35. These restrictions to the flows of fluid from the respective compression chambers 61 and 63 will resist substantially equally the approaching, similar movement of the frame and axle. Separating movements of the frame and axle will reverse the movements of the piston, that is, said pistons will be moved downwardly, and, if such movement of the frame members and axle is similar, then substantially equally restricted flows of fluid will be established as follows: from the compression chamber 62 through cross passage 76, past the valve 79 into the valve chamber 77 and through passage 82 into the compression chamber 61. In cylinder 35 the flow will be established from the compression chamber 64 through cross passage 100, duct 99, past the valve 103 into the valve chamber 101 and through the cross passage 112 which connects the valve chamber 101 with the compression chamber 63. The resistance to the similar, separating movements between the frame portions and the axle will be substantially equal.

When the movement between the frame members and the axle is dissimilar, that is, one frame member approaches the axle while the other frame member is separated therefrom, then an opposed movement of the pistons occurs. For instance, if the axle 20 approaches frame member 27, the piston 39 is moved upwardly, and, if at the same time the axle 20 moves away from frame member 28, then piston 40 will be moved downwardly. As has been described before, piston 40 moving downwardly establishes a flow from compression chamber 64 to the compression chamber 63 through duct 99 and past valve 103. As the piston 39 moves upwardly there will be established a flow of fluid from compression chamber 61 through duct 65, past the valve 70 into the compression chamber 62. Piston 39 moving upwardly, will also force fluid through the passage 110, in the cover 37, this fluid being directed upon the top of the abutment block 105, slidably supported within the valve chamber 101 and engaging one end of the valve spring 104. The pressure upon the abutment block 105 will move it toward the valve 105 and thus said block will increase the tension of the spring 104, whereby a greater resistance will be offered by said spring against the opening of valve 103 and thus a greater restriction to the flow of fluid from the compression chamber 64 past the valve 103 to the compression chamber 63 will be established, consequently the separating movement of the axle 20 from the frame member 28 will be more greatly resisted than the approaching movement of the axle 20 toward the frame member 27. If the frame portion 27 is separated from the axle 20 and the portion 28 is approached by the axle 20, then the fluid pressure from the compression chamber 63 will be exerted through the passage 111 in the cover 37 to increase the tension of the spring 80 and thus to increase the restriction to the flow of fluid from the compression chamber 62 to the compression chamber 61 and thus the separating movement between axle 20 and frame 27 will be more greatly resisted.

Fig. 3 illustrates diagrammatically a modified form of fluid displacement device designed to provide a greater resistance to rotational movement of one body with respect to another than to parallel motion between the two bodies. In this modified form the casing is designated by the numeral 125, said casing presenting two cylinders 126 and 127. A piston 128 is provided in the cylinder 126 and a piston 129 in the cylinder 127. These pistons are operated by rocker arms 130 in a manner similar to the pistons 39 and 40 of the device shown in the Fig. 2, and thus no detailed description of the connection between the pistons and the axle will be given.

Piston 128 forms compression chambers 140 and 141 in the cylinder 126 and piston 129 forms compression chambers 142 and 143 in the cylinder 127. A duct 145 connects the compression chamber 140 of the cylinder 126 with the opposite compression chamber 143 of the opposite cylinder 127. A similar duct 146 connects the compression chamber 142 of the cylinder 143 with the opposite compression chamber 141 of the opposite cylinder 126. A metering pin 147 extends into the duct 145 and a similar metering pin 148 extends into the duct 146. These metering pins are accessible from outside the casing to permit adjustment thereof.

When the frame members 27 and 28 are approached by the axle 20 with a similar movement, pistons 128 and 129 will be moved upwardly as regards Fig. 3. Compression chambers 140 and 142 of the cylinders 126 and 129 respectively are now being reduced in cubical content, due to this upward movement of cylinders 128 and 129, and they will discharge through ducts 145 and 146 respectively into the opposite compression chambers 143 and 141 of the opposite cylinders 127 and 126 respectively. The metering pins 147 and 148 will restrict the flow of fluid through the respective ducts 145 and 146 and thus the movement of the axle toward the frame members 27 and 28 will be resisted.

As the axle 20 moves away from the frame members 27 and 28, pistons 128 and 129 will be moved downwardly and thus compression chambers 141 and 143 will discharge through passages 146 and 145 into the compression chambers 142 and 140 respectively.

If a dissimilar movement between frame members 27 and 28 and the axle 20 occurs, for instance if frame member 27 is approached by the axle, and said axle moves away from the frame member 28, then piston 128 will be moved upwardly and piston 129 downwardly in its respective cylinder and thus the fluid in the compression chamber 140 will be forced through passage 145 toward the compression chamber 127 while at the same time the fluid in compression chamber 127 will be forced through the same passage 145 toward the compression chamber 140. These fluid pressures acting in opposite directions in the same duct or passage 145 will counteract each other, substantially resisting the opposed movement of the pistons 128 and 129 and thus the dissimilar movement between frame members 27 and 28 and their respective portions of axle 20 will be more greatly resisted. If the frame member 28 is approached by its axle portion and the axle moves away from the frame member 27, then counteracting pressures between compression chambers 126 and 142 will obtain and a similar resistance is provided against such dissimilar movement of the frame and axle members. To meet abnormal conditions, additional valves and oil passages may be provided with the construction shown in Fig. 3, however, these are omitted as they form no part of my invention relating to a shock absorber which will counteract "tramping" action as well as ordinary road shock motions of the axle.

While the form of embodiment of the present invention as herein disclosed, constitutes a preferred form, it is to be understood that other forms might be adopted, all coming within the scope of the claims which follow.

What is claimed is as follows:

1. An hydraulic shock absorber comprising in combination, a casing presenting two cylinders, said casing having a plurality of ducts, two of which separately connect the two ends of a respective cylinder; a piston in each cylinder; means for reciprocating said pistons; a fluid pressure release valve in each duct; and means operated by fluid pressure from one cylinder to adjust a fluid pressure release valve of the other cylinder.

2. An hydraulic shock absorber comprising, in combination, a casing presenting two cylinders; a piston in each cylinder forming a compression chamber at each end thereof, the compression chambers of each respective cylinder being in communication through two separate passages in the casing; means for reciprocating the pistons; a check-valve in each of said passages, the two check valves of each respective cylinder acting oppositely; and means under control of the one cylinder chamber to adjust a valve of the other cylinder passage.

3. An hydraulic shock absorber, comprising in combination, a casing presenting two cylinders; a piston in each cylinder forming a compression chamber at each end thereof, the compression chambers of each respective cylinder being in communication through two separate passages in the casing; means adapted separately to reciprocate the pistons; a spring-loaded pressure release valve in each of said passages, the valves of each cylinder acting in opposition; and pressure operated means adapted in response to fluid pressure in the one compression chamber of one cylinder to increase the spring tension upon one spring-loaded pressure release valve of the other cylinder.

4. An hydraulic shock absorber, comprising in combination, a casing presenting two cylinders; a piston in each cylinder forming a compression chamber at each end thereof, the compression chambers of each respective cylinder being in communication through two separate passages in the casing; means adapted separately to reciprocate the pistons; a spring-loaded pressure release valve in each of said passages, the valves of each cylinder acting in opposition, corresponding valves of the two cylinders acting to establish restricted flows of fluid between the compression chambers of the respective cylinders in response to similar movement of said pistons; and pressure operated means under control of one cylinder compression chamber for increasing the spring tension upon the valve leading from the opposite compression chamber of the other cylinder in response to dissimilar movements of the two pistons.

5. An hydraulic shock absorber comprising, in combination, a casing presenting two cylinders; a piston in each cylinder forming a compression chamber at each end thereof, the compression chambers of each respective cylinder being in communication through two separate passages in the casing; means adapted separately to reciprocate the pistons; a spring-loaded pressure release valve in each of said passages, the valves of each cylinder acting in opposition; pressure operable abutment blocks for the spring of one pressure release valve of each cylinder; a cover for the casing having passages connecting the one compression chamber of the respective cylinders with the chamber containing the abutment block of the valve of the other cylinder, whereby said block is operated by fluid pressure within a compression chamber of the relative cylinder.

In testimony whereof I hereto affix my signature.

JOHN H. HUNT.